United States Patent [19]

Gould

[11] 4,327,960

[45] May 4, 1982

[54] LENS CAP HOLDER

[76] Inventor: Arthur Gould, 1690 W. 6 St., Reno, Nev. 89503

[21] Appl. No.: 189,390

[22] Filed: Sep. 19, 1980

Related U.S. Application Data

[63] Continuation-in-part of Ser. No. 49,329, Jun. 18, 1979, abandoned.

[51] Int. Cl.³ .................... G02B 23/16; G03B 11/04; B65D 55/16
[52] U.S. Cl. .................................. 350/65; 220/375
[58] Field of Search ................... 350/65; 220/375; 215/306

[56] References Cited

U.S. PATENT DOCUMENTS 2,291,821  8/1942  McNabb .................. 350/65

FOREIGN PATENT DOCUMENTS 2296863  7/1976  France .................. 350/65

*Primary Examiner*—Jon W. Henry
*Attorney, Agent, or Firm*—Ladas & Parry

[57] ABSTRACT

The present invention relates to the field of photography and is directed to an improved lens cap holder to support the lens cap in close proximity to the camera when the camera is in use. The present invention is of one piece comprising an outer portion of generally rectangular form which fits around the lens barrel, and an inner portion forming a strap to which a patch of adhesive is affixed for attachment to a lens cap. The width of the strap is greater than its thickness which keeps the lens cap from twirling in the wind. When the outer rectangular portion is stretched around the lens, part of the shorter sides of said portion is distorted so that the outer portion does not overlie and obscure the index mark of many lenses.

4 Claims, 6 Drawing Figures

U.S. Patent            May 4, 1982            4,327,960
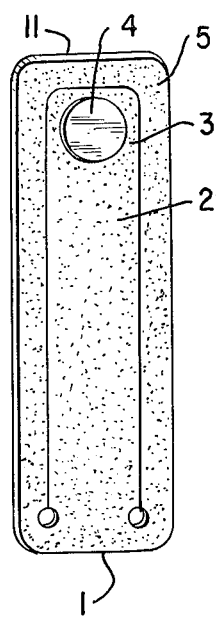
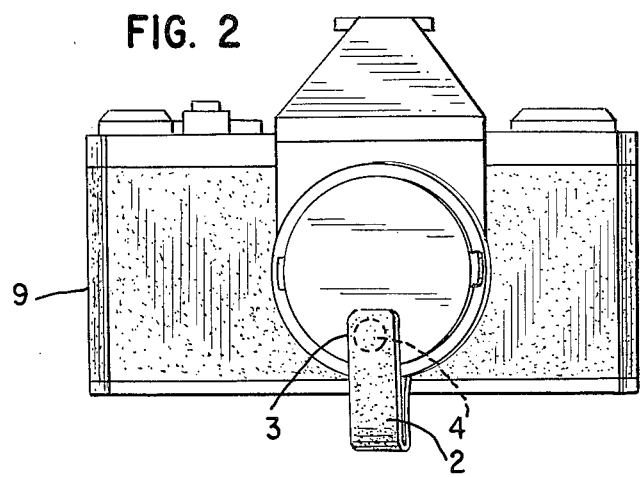
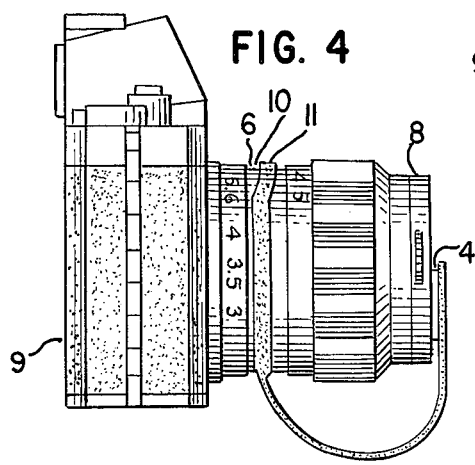
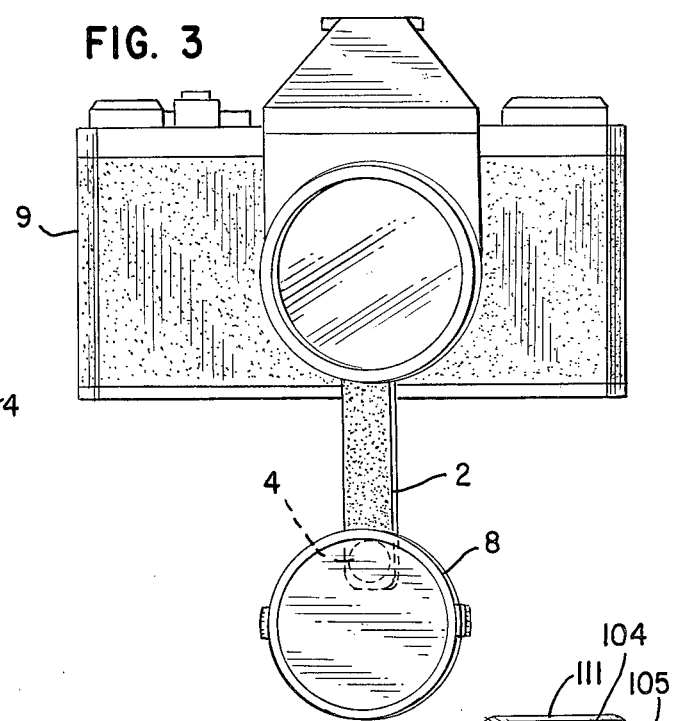
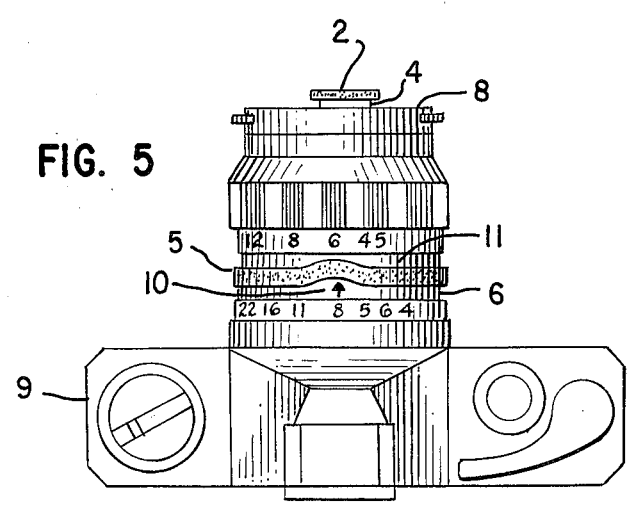
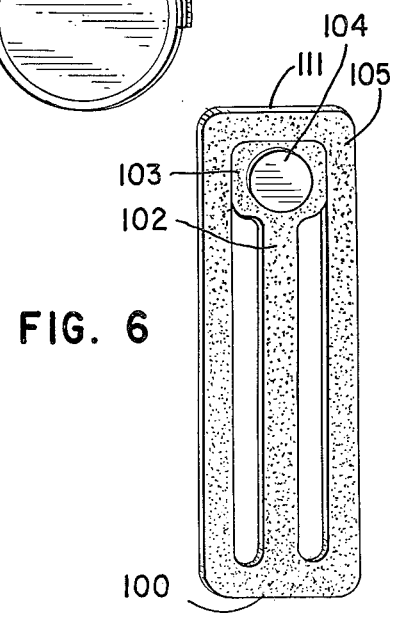

LENS CAP HOLDER

This application is a continuation-in-part of my application Ser. No. 49,329, filed June 18, 1979 now abandoned.

The present invention relates generally to means for covering the outer ends of the lens of a photographic camera or the like. More specifically, my invention is directed to an improved lens cap holder to support the lens cap in close proximity to the camera when the camera is in use.

In the past various attempts have been made to provide means for retaining a lens cap on a camera such that the lens cap can be readily removed to uncover the lens during camera use while being positively retained in close proximity to the lens for subsequent closure of the lens as desired. U.S. Pat. No. 2,291,821 discloses a strip-like, unitary lens cap holder made of rubber and formed with a first ring-like lens barrel engaging portion at one extremity, a second recessed lens capping formation adjacent the opposite end and a flat securing portion interconnecting the first and second portions of the holder. The capping formation is of predetermined dimension and is designed to frictionally engage and fit over the extremity of a lens. Necessarily, this limits the use of this holder to cameras having lenses of predetermined size. Further, in use it has been found that the circular lens barrel engaging portion of the holder frequently covers and obscures the index mark of many lenses in current use.

French Patent Publication No. 2,296,863 discloses a protective cover for the viewing lens of a firearm or rifle in which a lens cover is attached via a spring connecting device to a loop or band fitted around the lens barrel. The spring connecting device acts to positively maintain the cover out of the field of view of the lens. Here again, the overall device requires a lens cover of pre-determined dimension sized to fit a given viewing lens. Further, the circular attachment ring of this device if fitted on the lens barrel of a standard 35 mm camera would likely obscure the index mark on the lens as noted above.

It is evident, therefore, that despite these attempts no one has yet developed a simple, inexpensive holder for a camera lens cap which has wide application and which in use will not interfere with the ready use of the camera.

It is an object of this invention to provide a onepiece lens cap holder of simple and inexpensive manufacture that is capable of being readily used with the majority of the currently popular lenses for cameras and the like.

In a preferred embodiment, the lens cap holder is made such that it will not, in use, obscure the visibility of the index mark of the lens on which the holder is mounted.

A further object of the invention is to provide a lens cap holder incorporating a strap portion on which the lens cap is mounted, which retains the lens cap on the camera in such a manner as to resist a tendency of the lens cap to twirl in the wind.

The present invention therefore provides a lens cap holder comprising an elongated, generally rectangular elastic member having a longitudinal axis, extending between opposite ends of said member, said member also having a generally U-shaped cut therein extending along said axis and defining a relatively narrow, outer lens-engaging portion and an inner strap portion in said member, one end of said inner strap portion being integral with one of the holder member ends and the other end of said strap portion terminating in a free end disposed adjacent the other end of said holder member, the free end of said strap portion being adapted to receive an adhesive patch for attachment to a lens cap.

Further features and advantages of the invention will be apparent from the following description of preferred embodiments of the invention taken together with the accompanying drawings wherein:

FIG. 1 is a schematic view of one embodiment of the lens cap holder according to the invention;

FIG. 2 is a front view of the lens cap holder of FIG. 1 attached to the lens and lens cap when the camera is not in use;

FIG. 3 is a front view of how the lens cap holder of FIG. 1 supports the lens cap when the camera is in use;

FIG. 4 is a side view of how the lens cap holder of FIG. 1 supports the lens cap when the camera is in use.

FIG. 5 is a top plan view of the camera with the lens cap holder in place of FIG. 4 showing one of the advantages in use resulting from the novel form of the lens cap holder of the present invention;

FIG. 6 is a schematic view similar to FIG. 1 but showing a second embodiment of the lens cap holder of this invention.

FIG. 1 of the drawings illustrates a lens cap holder made in accordance with this invention which comprises an elongated substantially rectangular member 1 with rounded corners made of rubber or other elastic material. An elongated strap portion 2 is formed by an inverted U-shaped cut made in the holder member 1 with the outer ends of the cut terminating in enlarged openings in the member 1 to keep the cut material from tearing when stretched. The U-shaped cut also forms an outer lens engaging portion 5 of generally U-shaped shape including a bight portion 11 forming one end of the member 1. The free end 3 of the strap 2 adjacent the bight segment 11 of the outer portion 5 has an adhesive patch 4 provided thereon for attaching the strap 2 to a lens cap 8.

It will be noted that the width of the strap portion 2 is considerably wider than the thickness of the strap portion 2. This construction assures that in use the strap portion 2 will resist a tendency allowing twirling of the attached lens cap 8 in the wind which can be annoying and possibly disruptive to the operation of the camera 9.

In use, as shown in FIGS. 2-4, the outer portion 5 of the holder 1 is stretched around the barrel of the lens 6 of a camera 9 to secure the unit to the lens barrel and thereby to the camera 9. The free end 3 of the strap 2 is then secured to a lens cap 8 by means of the adhesive patch 4 thereon. By this arrangement, it is evident that the holder 1 of this invention can be used with lens caps of varying size and configuration since it is only required that the patch 4 be affixed to the lens cap.

FIG. 5 shows how the rectangular shape of the bight segment 11 of the outer portion 5 of the holder 1 causes the material of the holder 1 when stretched around the lens barrel, to distort from its circular path to expose the index mark 10 of the lens 6. Since many lenses manufactured today have an index mark arranged like that of the lens 6 in FIG. 5, this is a further important feature of the invention.

While the holder 1 of FIGS. 1-5 will function properly under most circumstances, I have found that the holder when mounted on a camera that is placed in a relatively tight fitting carrying case has a tendency to become separated from the lens cap under some circumstances.

More specifically, it has been noted that the relatively wide strap 2 of the holder 1 of FIG. 1 if bent to one side during insertion of the camera 9 in a carrying case has a tendency to separate from the patch 4 and/or the attached lens cap 8 owing to the restoring force in the elastic material of the strap 2 acting to straighten itself with the possibility that it will eventually work loose from the lens cap. I have found that this problem can be readily avoided without substantial change in my holder by simply reducing the width of the strap 2 which correspondingly reduces this undesirable tendency. This further improvement and alternate embodiment of the invention is shown in FIG. 6. The holder member 100 of FIG. 6 is identical to the holder member 1 of FIG. 1 save for a modified strap portion 102 terminating in a free end portion 103 on which an adhesive patch 104 is disposed. The outer portion 105 of holder member 100 and its bight segment 111 are identical to that shown in FIG. 1. The strap portion 102 is of reduced width over a substantial part of its length as shown in FIG. 6. The reduced width of the strap portion 102 is still made greater than its thickness to forestall twirling of an attached lens cap in a breeze as noted above. The outermost or free end 103 of the strap 102 is not reduced in width so as to provide a suitable area for mounting the adhesive patch 104. By virtue of the relatively narrower strap 102 thus provided, the adverse effects mentioned above involving inadvertent separation of holder and lens cap are avoided.

I claim:

1. A lens cap holder comprising an elongated, generally rectangular elastic member having a longitudinal axis extending between opposite ends of said member, said member also having a generally U-shaped cut therein extending along said axis and defining a relatively narrow, outer lens-engaging portion and an inner strap portion in said member, one end of said inner strap portion being integral with one of the holder member ends and the other end of said strap portion terminating in a free end disposed adjacent the other end of said holder member, the free end of said strap portion being adapted to receive an adhesive patch for attachment to a lens cap.

2. A lens cap holder according to claim 1, wherein the width of the strap portion is greater than the thickness of said strap portion.

3. A lens cap holder according to claim 1, wherein the outer portion is adapted to be stretched to encircle and engage a lens barrel of a camera in its use position, said outer portion in said use position lying in a plane passing transversely of said lens barrel, and wherein the bight segment of said outer portion being deflected out of said plane in said use position.

4. A lens cap holder according to claim 1, wherein the width of the strap portion is reduced over a substantial part of the length of the strap portion as compared to the width of the free end of said strap portion.

* * * * *